US006493754B1

(12) United States Patent
Rosborough et al.

(10) Patent No.: US 6,493,754 B1
(45) Date of Patent: *Dec. 10, 2002

(54) METHOD AND APPARATUS FOR ANALYZING COMMUNICATIONS ON DIFFERENT THREADS

(75) Inventors: James M. Rosborough, Lakewood; Steven J. Moore, Parker, both of CO (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/186,906

(22) Filed: Nov. 5, 1998

Related U.S. Application Data

(63) Continuation of application No. 09/133,069, filed on Aug. 12, 1998, which is a continuation of application No. 09/066,508, filed on Aug. 23, 1998, now abandoned, which is a continuation of application No. 08/513,435, filed on Aug. 10, 1995, now Pat. No. 5,781,449.

(51) Int. Cl.[7] .............................................. G06F 13/00
(52) U.S. Cl. ...................................... 709/224; 709/226
(58) Field of Search ................................. 709/224, 236; 370/241, 252, 253, 394; 700/226, 227, 203

(56) References Cited

U.S. PATENT DOCUMENTS

| 4,369,493 A | 1/1983 | Kronenberg ................. 364/200 |
| 4,802,164 A | 1/1989 | Fukuoka et al. ........ 395/183.02 |
| 4,835,766 A | 5/1989 | Arutaki et al. ................. 370/58 |
| 4,894,823 A | 1/1990 | Adelaman et al. ......... 370/94.2 |
| 4,894,846 A | 1/1990 | Fine ............................ 375/107 |
| 4,905,171 A | 2/1990 | Kiel et al. .............. 364/551.01 |
| 4,930,093 A | * 5/1990 | Houser et al. ............... 702/186 |
| 5,045,994 A | 9/1991 | Belfer et al. ........... 395/183.02 |
| 5,067,107 A | 11/1991 | Wade ......................... 395/500 |
| 5,095,444 A | 3/1992 | Motles ........................ 364/514 |

(List continued on next page.)

OTHER PUBLICATIONS

Shim et al., 1992, *IPCCC*, "Specification of Events and States in Complex Systems"; pp. 0679–0686.

Lustman, Mar. 1994, *IEEE Transactions on Software Engineering*, "Specifying Transaction–Based Information Systems with Regular Expressions"; 20(3), pp. 207–217.

U.S. patent application Ser. No. 09/212,836 filed Dec. 16, 1998 Entitled "Method and Apparatus for Identifying Informational Packets"; (Pending).

Preliminary Amendment to U.S. patent application Ser. No. 09/212,836.

U.S. patent application Ser. No. 09/132,362 filed Aug. 11, 1998 Entitled "Transaction Recognition and Prediction Using Regular Expressions"; (Pending).

*Primary Examiner*—Glenton B. Burgess
*Assistant Examiner*—Abdullahi E. Salad
(74) *Attorney, Agent, or Firm*—Baker Botts, L.L.P.

(57) ABSTRACT

The present invention provides a method and apparatus for measuring transaction response times. The method and apparatus can identify service request sequences corresponding to a transaction and the start and stop times for the transaction. The invention can be applied non-intrusively/non-invasively to the service packets communicated between a source and destination node.

72 Claims, 8 Drawing Sheets

U.S. PATENT DOCUMENTS

| | | | |
|---|---|---|---|
| 5,101,402 A | 3/1992 | Chiu et al. | 370/17 |
| 5,175,417 A | 12/1992 | Fujishima et al. | 235/380 |
| 5,245,638 A | 9/1993 | Gustofson | 364/550 |
| 5,247,517 A | 9/1993 | Ross et al. | 370/85.5 |
| 5,303,166 A | 4/1994 | Amalfitano et al. | 364/551.01 |
| 5,315,580 A | 5/1994 | Phaal | 370/13 |
| 5,331,574 A | 7/1994 | Temoshenko et al. | 364/551.01 |
| 5,351,243 A | 9/1994 | Kalkunte et al. | 370/92 |
| 5,371,689 A | 12/1994 | Tatsuma | 364/569 |
| 5,379,406 A | 1/1995 | Wade | 395/500 |
| 5,430,709 A | 7/1995 | Galloway | 370/13 |
| 5,461,614 A * | 10/1995 | Lindholm | 370/394 |
| 5,491,750 A | 2/1996 | Bellare et al. | 380/21 |
| 5,491,792 A | 2/1996 | Grisham et al. | 395/514 B |
| 5,539,659 A | 7/1996 | Mckee et al. | 364/514 B |
| 5,563,875 A | 10/1996 | Hefel et al. | 370/15 |
| 5,598,535 A | 1/1997 | Brech et al. | 395/200.13 |
| 5,619,656 A | 4/1997 | Graf | 395/200.11 |
| 5,627,886 A | 5/1997 | Bowman | 379/111 |
| 5,644,717 A | 7/1997 | Clark | 395/200.11 |
| 5,668,801 A | 9/1997 | Grünenfelder | 370/253 |
| 5,675,510 A * | 10/1997 | Coffey et al. | 709/224 |
| 5,684,945 A * | 11/1997 | Chen et al. | 714/20 |
| 5,706,429 A | 1/1998 | Lai et al. | 395/200.01 |
| 5,708,780 A | 1/1998 | Levergood et al. | 395/200.59 |
| 5,754,768 A | 5/1998 | Brech et al. | 395/200.6 |
| 5,764,912 A | 6/1998 | Rosborough | 395/200.54 |
| 5,781,449 A | 7/1998 | Rosborough | 364/514 |
| 5,787,253 A * | 7/1998 | McCreery et al. | 709/231 |
| 5,802,302 A | 9/1998 | Waclawsky et al. | 395/200.54 |
| 5,826,270 A | 10/1998 | Rutkowski et al. | 707/10 |
| 5,838,920 A | 11/1998 | Rosborough | 395/200.54 |
| 5,862,335 A * | 1/1999 | Welch, Jr. et al. | 395/200.54 |
| 5,881,051 A * | 3/1999 | Arrowood et al. | 370/248 |
| 5,911,048 A | 6/1999 | Graf | 395/200.54 |
| 5,946,302 A * | 8/1999 | Waclawsky et al. | 370/252 |
| 6,006,242 A | 12/1999 | Poole et al. | 707/531 |
| 6,012,096 A * | 1/2000 | Link et al. | 709/233 |
| 6,018,619 A | 1/2000 | Allard et al. | 395/200.54 |
| 6,070,190 A | 5/2000 | Reps et al. | 709/224 |
| 6,137,782 A * | 10/2000 | Sharon et al. | 370/255 |
| 6,144,961 A * | 11/2000 | de la Salle | 707/10 |
| 6,317,787 B1 * | 11/2001 | Boyd et al. | 709/224 |

* cited by examiner

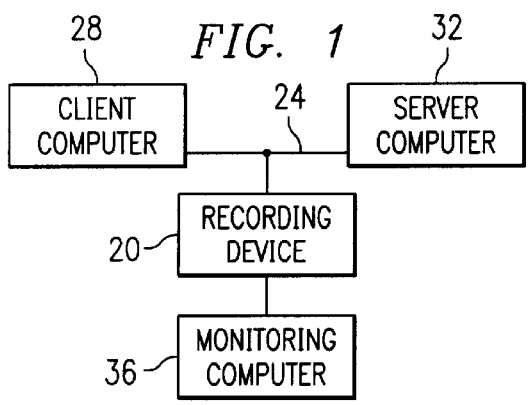
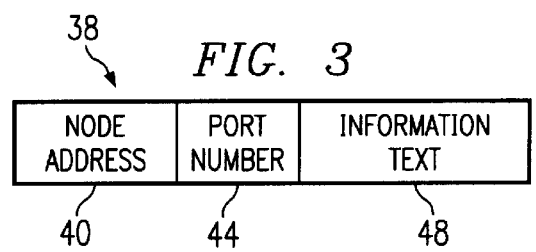
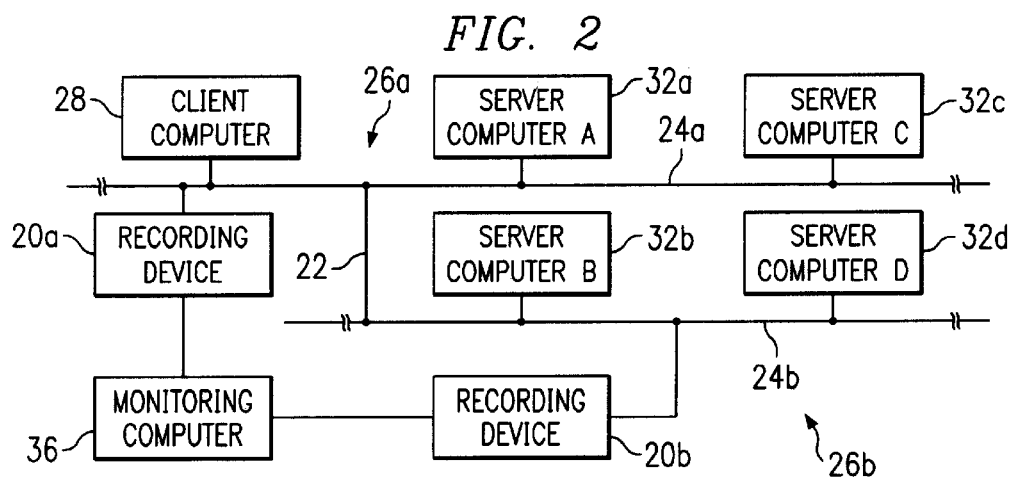
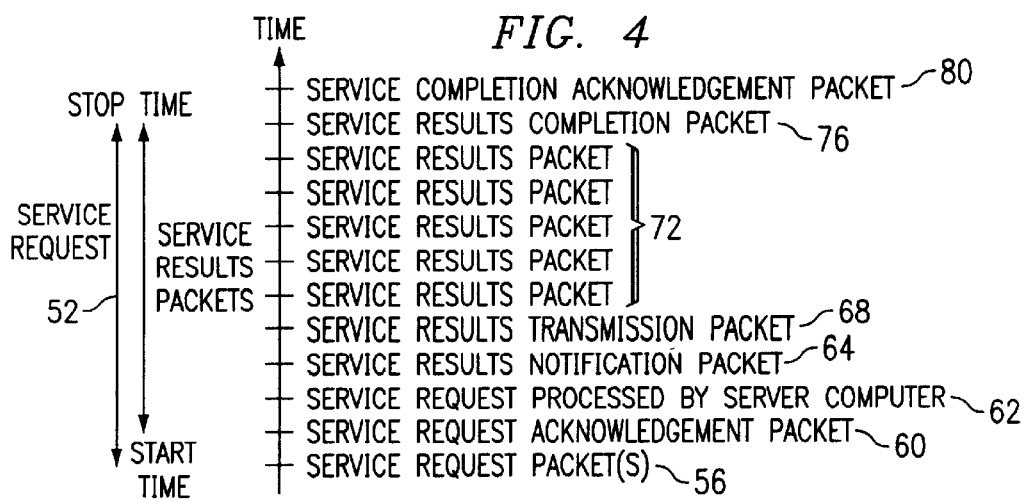

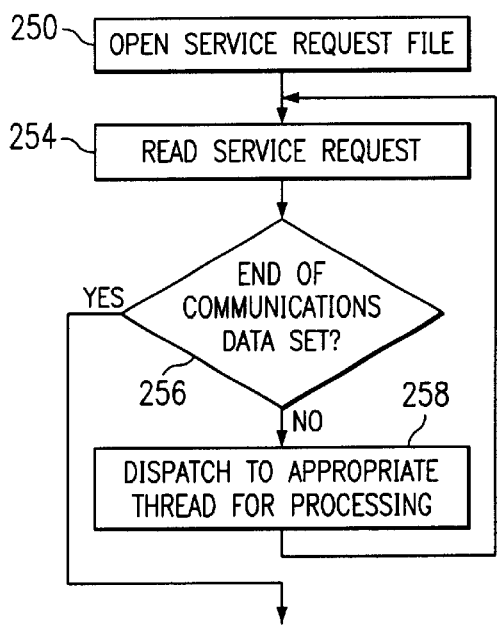
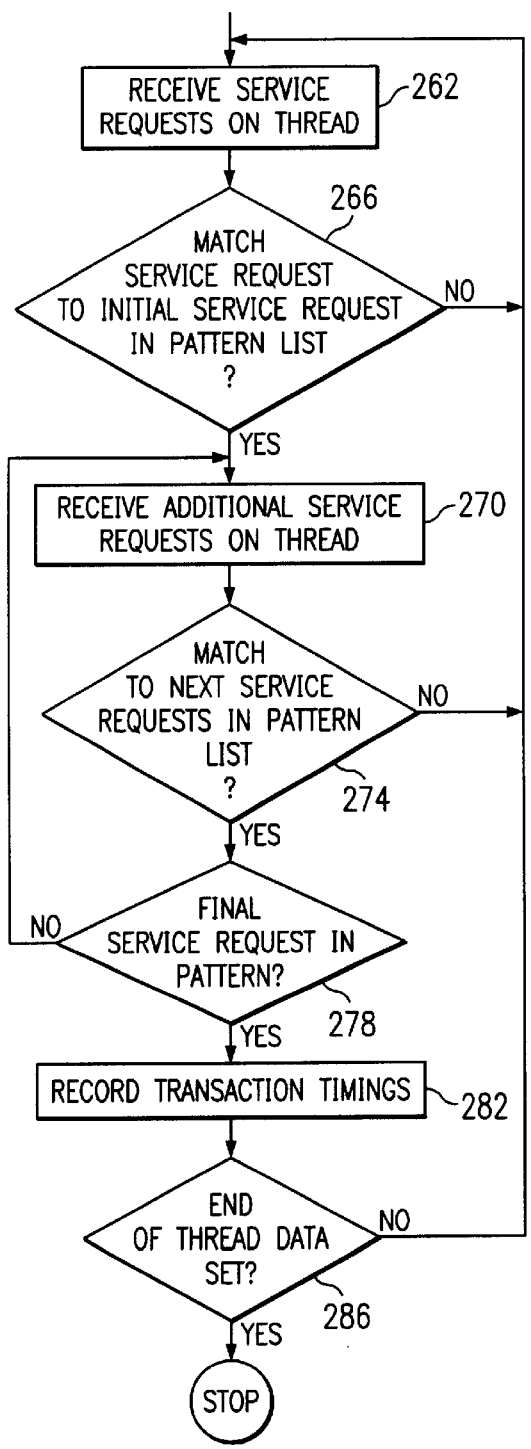

METHOD AND APPARATUS FOR ANALYZING COMMUNICATIONS ON DIFFERENT THREADS

The present invention is a continuation of U.S. patent application Ser. No. 09/133,069, filed Aug. 12, 1998, still pending which is a continuation of U.S. patent application Ser. No. 09/066,508, filed Aug. 23, 1998 (abandoned) which is a continuation of U.S. patent application Ser. No. 08/513,435, filed Aug. 10, 1995 (now issued as U.S. Pat. No. 5,781,449).

FIELD OF THE INVENTION

The present invention is directed generally to the measurement of response time in computer applications and specifically to the use of non-intrusive devices to measure response time in multi-tiered computer networks.

BACKGROUND OF THE INVENTION

Multi-tiered computer networks are widely used to provide one or more users with a wide variety of information and computer resources. In multi-tiered computer networks, client computers (e.g., users) interact with server computers to perform an application which is partitioned into one or more transactions. An application is a group of meaningful transactions, and a transaction is a unit of meaningful work as perceived by the user. A transaction is typically a collection of service requests, with the service request typically being a collection of service packets. A service packet is simply an item of information, or a message, communicated between computers. In the course of performing a transaction, the client computer may request one or more of the server computers to transfer service packets containing data to the client computer or provide service packets containing data to the server computer(s) to permit the server computer(s) to process the request. The server computers can in turn request the services of other server computers in connection with the data transfer request from the client computer.

Performance monitoring of the network is important to ascertain periods of significant transaction user delays and user productivity. Performance monitoring generally seeks to measure the response time for a transaction or application. The response time is the time required for the servers and network to perform the transaction or application. Statistical analysis can be performed on the response times to facilitate analysis of servers and network performance.

Two methods are commonly used to monitor network performance and provide response times. Intrusive/invasive monitoring techniques alter the software code on the client computer to include a marker command. The marker commands inform a listening device of transmission of the initial service request packet to initiate timing measurement and receipt of the final results or acknowledgement packet to cease timing measurement. Non-intrusive/non-invasive monitoring techniques, in contrast, typically do not alter the software code. Rather, a probe is inserted into a communication line between the client and server computers to monitor the delays between transmission of individual packets between the client and server computers to provide a rough estimate of response time.

Intrusive/invasive and non-intrusive/non-invasive techniques each have a number of drawbacks. In the case of intrusive/invasive techniques, though the transaction response time is provided, few multi-tiered applications are written with embedded marker commands in the code. Even if the applications were to have embedded marker commands, technical problems, can arise due to and consolidation of application-embedded response time statistics to a central location, especially for mobile user computers. In the case of non-intrusive/non-invasive techniques, it is only possible to determine the rate of information transmission between the computers for individual packets. Such techniques are typically unable to determine the response time for a transaction or application. Neither intrusive/invasive nor non-intrusive/non-invasive monitoring techniques are able to match, especially in multi-tiered networks, individual packets with the corresponding transaction to compute a response time for the transaction or related application. As noted above, each of the server computers performing an application can process a series of individual service requests pertaining to a variety of different user transactions. Existing monitoring techniques are unable to match the service packets in the various service requests to a specific transaction.

There is a need for an apparatus and method for measuring the response time for a transaction or an application, especially in multi-tiered computer networks. There is related need for an apparatus and method for measuring the response time for a transaction or an application using non-intrusive/non-invasive techniques.

There is a need for an apparatus and method for measuring the response time for a transaction or an application that is able to match individual service packets with the corresponding transaction or application.

SUMMARY OF THE INVENTION

The present invention addresses these and other needs by providing in one aspect a method for identifying a transaction corresponding to a plurality of service packets communicated between a source node and a destination node. The method includes the steps: (i) providing a communications data set including a plurality of service packets and information relating to the order in which the service packets are communicated on a communications line between the source and destination nodes and (ii) comparing the communications data set against a pattern characterization data set to determine whether at leas a portion of the plurality of service packets are part of the transaction. The pattern characterization data set includes information relating to a predetermined ordering of service packets that comprise the transaction. The method is amenable to non-intrusive/non-invasive measuring techniques and can provide near real-time response time information, even for multi-tiered computer networks.

The invention is based in part upon the recognition that the service packets communicated along the communications line constitute patterns of service requests that occur repeatedly in an operational environment. These service request patterns correspond to different transaction types. It has been discovered that these service request patterns can be determined using signal processing techniques. Once identified, the start and stop times for the pattern can be determined to provide a response time for the transaction.

A probe can be used to read, the packets on a real-time basis from the communications line with the packets being recorded along with a received time (e.g., the time at which the packet was read by the probe) in the communications data set.

The packets can be filtered based on a node address and/or port number. In a preferred embodiment, the service packets correspond to a plurality of threads and the packets are sorted by thread.

The service request packets can be identified by their contents and destination. The service result packets can then be correlated with the corresponding service request packets. The start and stop times for the service request can then be determined.

After identification of the service requests corresponding to the transaction, the response time for the transaction can be determined using the various start and stop times for the service requests.

In another aspect of the present invention, a non-intrusive system is provided for identifying a transaction comprising a plurality of service packets communicated between source and destination nodes. The system includes: (i) a device for recording a plurality of service packets communicated on the communications line and (ii) a device, in communication with the recording device, for identifying a transaction that includes at least a portion of the plurality of packets.

In yet another aspect, the present invention provides a method for identifying a transaction comprising a plurality of service packets communicated between source and destination nodes that includes the steps: (i) providing a communications data set including (a) a plurality of service packets corresponding to a plurality of service requests and (b) the start and stop times for each service request and (ii) comparing the time interval between the stop of a first service request and the start of a second service request against a predetermined value for the time interval to identify a sequence of service requests that comprise a transaction.

The comparing step can be performed in several iterations where the time interval is varied to select an optimal predetermined value for the time interval between service requests to yield a substantially optimal listing of service request sequences as a possible transaction. The resultant number of transaction service request patterns are then used to determine an optimal value for the predetermined time interval. For a range of time intervals the number of transaction service request patterns remains constant. The optimal value for the predetermined time interval is the midpoint of this range of values. By way of example, after identifying a service request sequence(s) using the predetermined values, the method can further include selecting a second predetermined value, comparing the time intervals, between service requests, against the second predetermined value to identify a second sequence(s) of service requests corresponding to a second transaction(s), and recording the second sequence(s) of service requests and the number of occurrences of each of the second sequence(s) in a second data set. The method next selecting a third predetermined value (which is the optimal predetermined value) based on the relationship between (i) the number of the sequence(s) of service requests and the predetermined value and (ii) the number of the second sequence(s) of service requests and the second predetermined value. The method then comprises as before the time interval between service requests against the third predetermined value for the time interval to identify a third sequence(s) of service requests corresponding to a third transaction(s). The service request sequence for the third transaction is deemed to be the optimal sequence. The third sequence is then compared against the communications data set to determine whether at least a portion of the plurality of service requests correspond to one or more transaction(s).

The method produces the pattern characterization data set referred to above. The pattern characterization data set lists a plurality of service request sequences for comparison against the service requests from the comparing step. This additional comparison step is to determine if the service requests as ordered by time are contained in the pattern characterization data set.

In a final aspect, the present invention includes a non-intrusive system for determining transaction level activity between a source and destination node. The system includes: (i) a device for recording a plurality of service packets communicated on a communications line between source and destination nodes and (ii) a device for determining the number The service packets relate to a number of transactions and the recording device provides the communications data set.

In one embodiment, the determining device is a device for comparing the time interval between the stop time of a first service request and the start time of a second service request against a predetermined value for the time interval to identify a sequence of service requests in the communications data set that together comprise a transaction.

BRIEF DESCRIPTION OF THE DRAWINGS

FIG. 1 depicts an embodiment of the present invention connected to a computer network;

FIG. 2 depicts another embodiment of the present invention connected to a multi-tiered computer network;

FIG. 3 depicts a service packet;

FIG. 4 depicts an example of the service packets in a service request;

FIGS. 6A–E depict a first embodiment of a method according to the present invention for determining response time;

DETAILED DESCRIPTION

Figure 5:
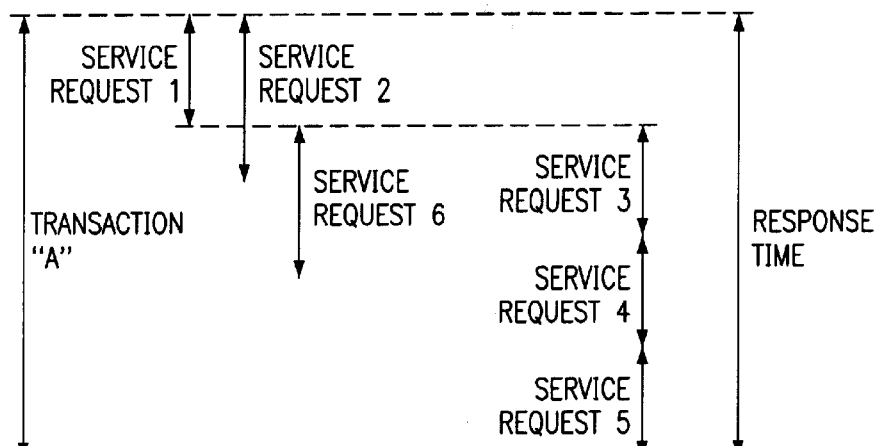
FIG. 5 depicts the response time for a transaction involving a number of service requests.

The present invention is directed to a method and apparatus for measuring response times for a transaction or an application using non-intrusive/non-invasive techniques. As noted above, non-intrusive/non-invasive monitoring techniques do not interrupt the software code to measure response time. Rather, such techniques monitor the network communications between the client computer and the various server computers. Unlike existing performance monitoring methods, the method of the present invention matches selected service packets and associated start and stop time information for the service packets with the corresponding transaction or application. After the matching step, the method provides response times for the transaction or application. The present invention is useful not only for performance monitoring but also for billing and monitoring of service level agreement compliance.

The Apparatus Configuration

The apparatus configuration according to the present invention is depicted in FIGS. 1 and 2. Referring to FIG. 1, the simplest single network segment is depicted. In the network, a recording device or probe 20 is connected to a communication line or busline 24 between a client computer 28 and a server computer 32. The recording device 20 selects service packets transmitted along the communication line 24 and provides the service packet and the time at which the service packet was received by the recording device 20 to the monitoring computer 36 for analysis. FIG. 2 depicts a more complex multi-tiered architecture with multiple network segments. Recording devices 20*a,b* are connected via a communications device 22, such as a modem, to the communication lines 24*a,b* between the network segments 26*a,b*. The network segments include client computer 28 and server computers 32*a,b c,d* and the communication lines 24*a,b*. As can be seen from these figures, the present invention does not measure response time within the various client and server computers as in intrusive/invasive monitoring techniques, but measures response time by monitoring the network communications on the communications line between the client computer and the various server computers.

The number and locations of the recording device(s) 20 in a multi-tiered computer network depend upon the application. Typically, a recording device 20 will be located on any portion of the communication line 24 that is between the points of access of the drivers of client or server computers to the communications line 24. In this manner, all of the service packets communicated on the communications line 24 will be read by a recording device 20 and an accurate determination of the response time for a transaction or application involving multiple client and/or server computers can be made.

The text of a typical service packet communicated between computers in a multi-tiered computer network is depicted in FIG. 3. As can be seen from FIG. 3, a service packet 38 typically includes a node address 40, which identifies the source and destination of the service packet, a port number 44, and additional information 48. Depending upon the application, the service packet can have additional information, such as a database request, file system request and object broker request.

There are generally two types of service packets, namely service request and service results packets. Service request packets request a server computer to perform a specific action. Service results packets are service packets generated in response to the service-request packet. Service results packets can contain a variety of information including the information requested by the service request packet.

To illustrate the use of two types of service packets in a service request, an example of a service request involving numerous service packets is depicted in FIG. 4. A typical service request 52 begins with the service request packet 56 (which can be multiple service packets) issued by, for example, a client computer to a server computer. The server computer then transmits a service request acknowledgement packet 60 to the client computer and begins processing the request. When the server computer has completed processing the service request, the server computer sends a service results notification packet 64 to the client computer that the server computer is ready to send the service request's data to the client computer. The client computer then transmits a service results transmission packet 68 requesting transmission of the data. The service computer commences transmitting service results packets 72. The service results completion packet 76 notifies the client computer that the final service results packet has been transmitted, and the service results acknowledgement packet 80 notifies the server computer that the information has been received. The response time to complete the service request is the difference between the received time for the service request packet 56 and the received time for the service completion acknowledgment packet 80.

To further illustrate the response time for a transaction, an example of a transaction involving numerous service requests will be described with reference to FIGS. 2 and 5. A type "A" transaction executed on the client computer 28 makes service request 1 of server computer 32*a* and service request 2 of server computer 32*b*. To complete service request 1, server computer 32*b* makes service request 3 of server computer 32*c*. When service request 1 is completed, the type "A" transaction makes service requests 4 and 5 of server computer 32*d* and service type 6 (e.g., service request 6) of server computer 32*c*. The pattern of service requests to the various server computers identifies the transaction as a type "A" transaction. The response time for the type "A" transaction is measured from the start time of service requests 1 and 2 to the stop time of service request 5. Thus, the transaction response time is simply a collection of individual service request response times.

The Filtering of Service Packets

FIGS. 6A–E provide a flow schematic depicting a first embodiment of a performance monitoring method according to the present invention. The method collects selected service packets from the recording device(s) and filters the selected service packets to form a communications data set. The network communications are filtered to yield only those service packets relevant to the applications of interest. As will be appreciated, it is possible that multiple applications on the same client computer request the same type of services from a specific server computer. It is also possible that a service provider may migrate from one server computer to another server computer of the same type.

The first embodiment is based on the assumption that the packets of a given transaction are located on only one thread. A given thread can, however, have packets from more than one transaction. A second embodiment of the present invention is discussed below for an application in which a given transaction occurs on more than one thread.

As used herein, a thread is a specific identifiable connection or session between a service requester node and a service provider node. A thread is preferably identified such that it can have only one service request on it at a given point in time. As will be appreciated, in some applications the node address is not an adequate identifier of each thread because there can be multiple sessions for a given node address. In such cases, the connection or session identification information is used to further identify the thread to which the service packet is to be dispatched. A thread can be either a user thread, which is a thread that is uniquely identifiable to a specific client computer, or a shared thread, which is a thread shared among multiple user requests.

Figure 6A:
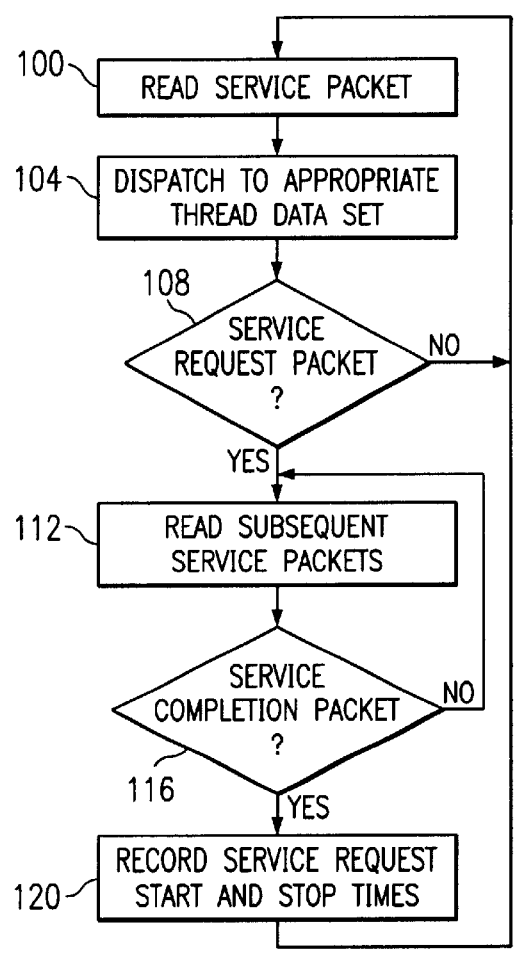
Figure 6B:
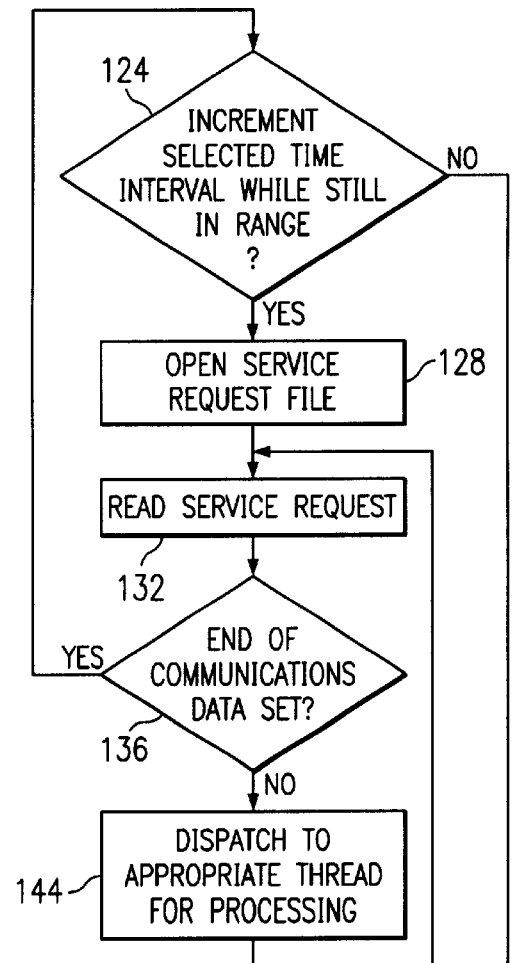

Referring to FIG. 6A, one or more recording devices 20 first read in command box 100 one or more service packets from the communications line 24. Based on the node address or other thread identification information, a recording device 20 determines if the service packet pertains to the client computer(s) and/or server computer(s) (e.g., threads) of interest. If so, the service packet is recorded and the time the service packet was read by the recording device 20 (e.g., received time); otherwise, no record is made of the service packet. If one were interested in a particular subset of service requests, the recording device 20 could filter based not only on the node address or other thread identification information but also on the port number. The port number is useful for filtering if the application is configured such that there is only one service request on a port at a given point in time.

In a command box 104, the service packet is recorded in a communications data set by being dispatched to an appropriate thread data set. The communications data set contains the service packets read by all of the recording devices organized by the thread. There is a thread data set for each thread. In most applications, a plurality of thread data sets in the communications data set are active at any point in time.

The service packet is next examined in decision box 108 to determine if it is a service request packet. This is accomplished by searching in the text of the service packet for a key word(s) and/or symbol(s) unique to a service request packet; that is, the words and/or symbols are not used in service results packets. The words and/or symbols used in the search can be specific to a given transaction and/or application.

If the service packet is an initial service request packet, the subsequent service packets are read in command box 112 to identify in decision box 116 the service completion packet. The service completion packet is the final service results packet in a service request. As noted above, there will only be one set of service packets for a specific service request that is serial on the thread at a particular moment in time. The set of service packets for a given service request comprise a service data subset. Accordingly, the matching of the service request packet with the corresponding service results packets is a relatively straightforward process.

There are two methods to identify the service completion packet. In one method, the text in each service results packet is searched for key word(s) and/or symbol(s) only associated with one or more of the service results packets. In the other method, the service packet having the latest received time is assumed to be the service completion packet. In other words, the last service packet on the thread before the immediately succeeding service request packet is assumed to the service completion packet. The last packet on the thread can be sent by either the client or server computer. Which of the two methods is preferred in a specific case depends upon the application.

After the service request and service completion packets are identified in decision box 116, the start and stop times for the service request are recorded in command box 120 in the communications data set along with the thread identification information and a service request identifier and possibly recording device location. The start time is the received time for the service request packet, and the stop time is the received time for the service completion packet. The service request identifier can be any suitable means for identifying the type of service to which the service request pertains. By way of example, the service request identifier can be a command or a portion thereof, especially in data processing applications. The communications data set can include other information, including the location of the recording device 20 on the communications line 24, network type and other recording information.

The preceding steps are repeated on a packet-by-packet basis for the service packets communicated along a section of the communications line 24 over a selected time period. The time period can be discrete or continuous. In either case, the communications data set is, after an appropriate time interval, subjected to the steps discussed below to identify response time.

For service packets having encrypted or compressed data, it is typically necessary to know or determine the compression algorithm before applying the filtering steps. Additional steps may therefore be required to unencrypt or uncompress the packets.

The Transaction Pattern Finding Steps

In a series of transaction pattern finding steps discussed in detail below, the monitoring computer 36 analyzes the communications data set to identify a sequence of service requests that together comprise a possible transaction pattern. Generally, the monitoring computer 36 identifies the service request sequence by comparing the time interval between the stop time of a first service request and the start time of a succeeding service request against a predetermined value or the time interval. If the time interval is less than or equal to the predetermined value, the service requests are deemed to be part of the same transaction and if the time interval is more than the predetermined value, the service requests are deemed to be part of separate transactions. Accordingly, the selected time interval is selected based on the maximum projected time interval between adjacent service requests for the two service requests to be considered part of the same transaction.

Referring to FIG. 63 to initiate the transaction pattern finding steps, a selected time interval can be increased or decreased by a selected time increment in decision box 124. If the selected time interval is at the upper or lower limit of the desired range of time interval values, processing is terminated. The selected time interval and incremental increases or decreases thereof are discussed in greater detail below. As will be appreciated, a smaller selected time interval yields a smaller number of possible transaction patterns than a larger selected time interval.

After selection of the appropriate selected time interval, the monitoring computer 36 in command box 128 opens for all of the selected time intervals a service request file, to contain information generated in the succeeding steps. As discussed below, the service request file will contain the service requests sorted by thread and selected time interval.

Returning to FIG. 6B, the monitoring computer next reads in command box 132 a service request from the communications data set and, in decision box 136, determines if all of the service requests in the communications data set have been read. If so, the monitoring computer goes to decision box 124. If not, the monitoring computer dispatches the service request in command box 144 to the appropriate thread to form a thread data set with one thread data set existing for each thread. As the various service requests are read from the communications data set and dispatched to the thread data sets for each selected time interval, a collection of service requests can form in each thread data set. The service requests in each thread data subset are ordered by their respective start and stop times. Thus, as noted above, each of the service requests in the collection is separated from an adjacent service request by a time interval. Command boxes 132, 144 are repeated until all of the service requests in the communications data set are sorted by thread for each selected time interval.

Figure 6C:
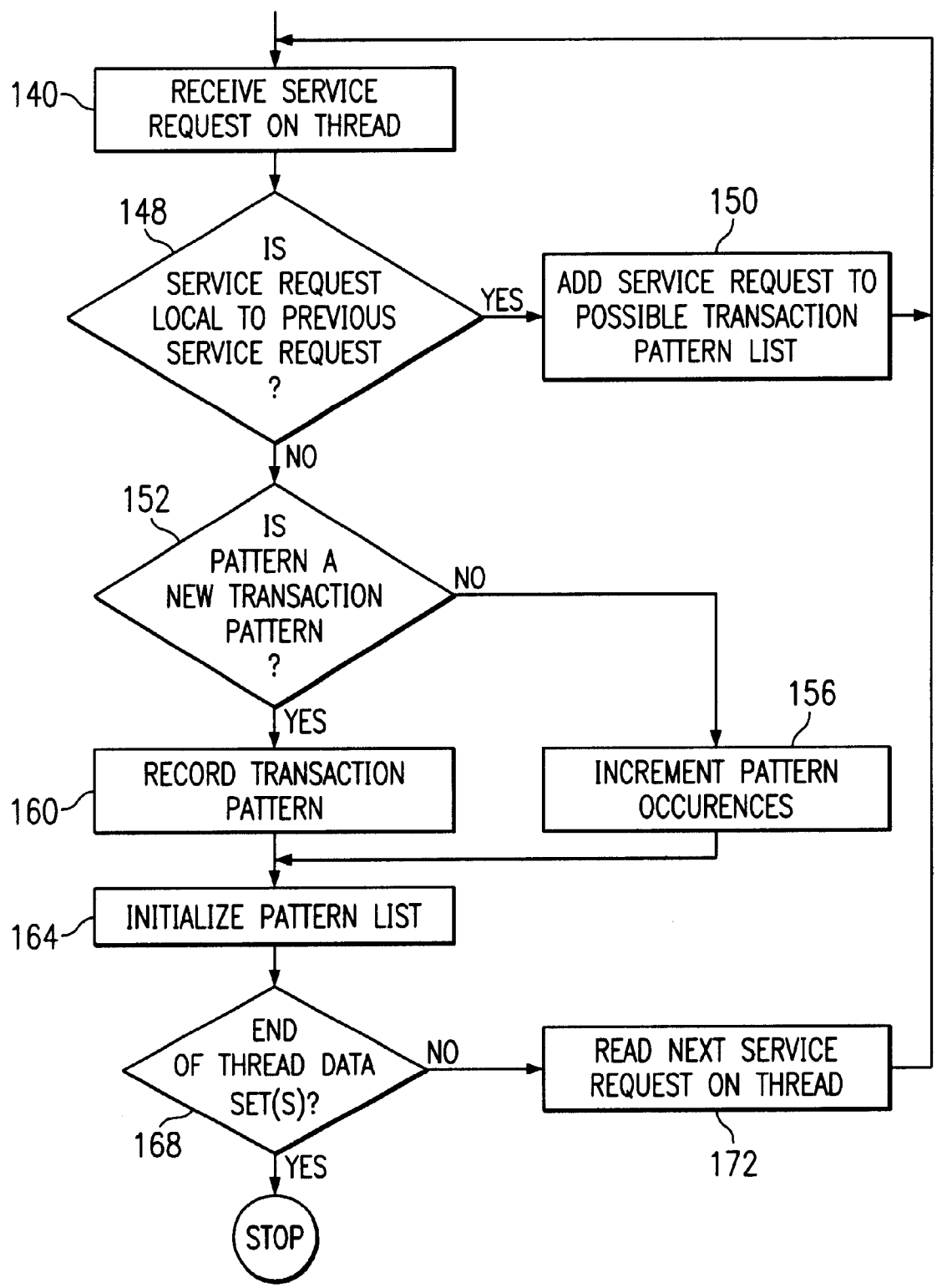

After the computer in decision box 124 determines the all selected time intervals have been analyzed, the computer proceeds to command box 140. In command box 140, the service requests from the communications data set are all received into the various thread data sets. As will be appreciated, the ensuing steps in FIG. 6C are performed for each selected time interval in the service request file.

The service requests in each thread data set are next examined in decision box 148 to determine if the various service requests are local to another service request in the thread data set. A service request is local to another service request if the time interval between the service requests is no more than the selected time interval. If the service requests are local to one another, the service requests are considered to be components of the same transaction. If the service requests are not local to one another, the service requests are considered to be components of different or separate transactions.

Figure 7:
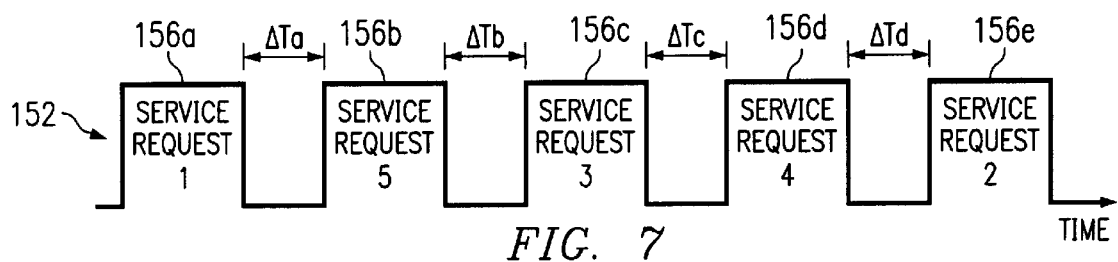
FIG. 7 depicts the interactions of service requests in the pattern finding and matching steps.

Referring to FIG. 7, a string or sequence of service requests of the type generated in each thread data set in the service request file is illustrated. The string or sequence of service requests can refer either to a collection of service requests that are local with respect to at least one other service request in the sequence or to a single service request that is not local to another service request. As will be appreciated, a possible transaction pattern can have one or more service requests. Thus, in FIG. 7, the time intervals $\Delta Ta-d$ separating the service requests 156$a$–$e$ are no more than the selected time interval.

If a service request in a thread data set is local to another service request in the thread data set, the service requests in command box 150 are combined and added as a new possible transaction pattern to a possible transaction list in a pattern characterization data set in the service request file. As will be appreciated, the service request can be local to another service request that is either discrete or part of a string or sequence of a number of service requests. In this manner, a sequence of service requests corresponding to a given possible transaction pattern is progressively expanded to include additional service requests.

The pattern characterization data set can include a variety of information, including the various selected time intervals and the corresponding thread data sets, with each thread data set including variables for identification of the thread, the various service requests associated with the thread organized in service request sequences, and the number of occurrences of each service request sequence. This list of service request sequences is hereinafter referred to as the possible transaction pattern list.

The pattern characterization data set can also include other information depending upon the application. By way of example, the pattern characterization data set can include the transaction type associated with each sequence of service requests. The transaction type can be based upon the identity of one or more of the service requests in the service request sequence corresponding to the transaction (e.g., the service request identifier).

The generation of the pattern characterization data set is initiated in command box 140 by receiving a service request from a thread data set in the record file. If the subject service request is not local to a previous service request in the thread data set, the service request sequence that immediately precedes in time the subject service request, if any, is compared in decision box 152 to previously identified patterns in all of the thread data sets for the related selected time interval in the pattern characterization data set to determine if the pattern has previously been recorded (discovered) for the selected time interval.

If the preceding service request sequence is not a new possible transaction pattern, the number of occurrences of the possible transaction pattern for the selected. time interval is incremented in command box 156. More specifically, the recorded number of occurrences of the possible transaction pattern having the same sequence of service requests is increased by one.

Returning to decision box 152, if the service request sequence preceding the subject service request is a new possible transaction pattern for the selected time interval, the monitoring computer in command box 160 records the service request sequence on the possible transaction pattern list.

After command boxes 156, 160, the possible transaction pattern list is initialized in command box 164 to begin a new service request string for the selected time interval beginning with the subject service request. Based on the fact that the subject service request is not local to the immediately preceding service request, the program assumes that the service request sequence of which the immediately preceding service request is a part is completed. Because the service request is not local to a prior service request, the monitoring computer assumes that the service request is a part of a new service request sequence.

After command box 164 is completed, the monitoring computer determines in decision box 168 if the end of the thread data set(s) in the record file has been reached for all of the service requests in all of the selected time intervals. If so, the process is terminated. If not, the computer proceeds to command box 172 and receives another service request from a thread data set in the record file.

After command boxes 150 and 172 are completed, the monitoring computer returns to command box 140 and the preceding steps are repeated until all service requests in the record file have been read and processed.

In a communications data set having a plurality of threads, the monitoring computer applies the transaction pattern finding steps in parallel to service requests from different threads. Thus, the service requests in a plurality of different thread data sets are analyzed simultaneously. Accordingly, at any point in time, a plurality of thread data sets can be active.

In a preferred embodiment, an optimal value for the selected time interval is selected by first selecting a series of selected time intervals for decision box 124. As noted above, the predetermined values can be selected using a predetermined increment in decision box 124. The values used for the selected time intervals are usually subsecond intervals ranging, for example, from about 50 to about 500 milliseconds.

Figure 8:
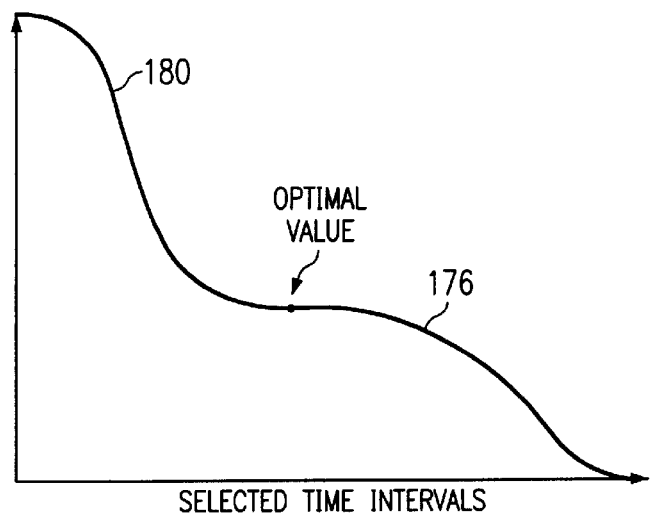
FIG. 8 is a plot of the predetermined time value against the number of transactions discovered.

Referring to FIG. 8, after the performance of the above-noted command and decision boxes with various selected time intervals, the numbers of possible transaction patterns from the pattern characterization data set (e.g., vertical axis) are plotted against the.corresponding selected time intervals (e.g., horizontal axis). An optimal value for the selected time interval is selected in the central portion of the plateau 176 on the curve 180. Using the optimal value in decision box 124, the transaction pattern finding steps are repeated to yield a second pattern characterization data set. The transaction patterns in the second pattern characterization data set are believed to be the substantially optimal listing of transaction patterns for the various service requests in the record file.

Figure 9A:
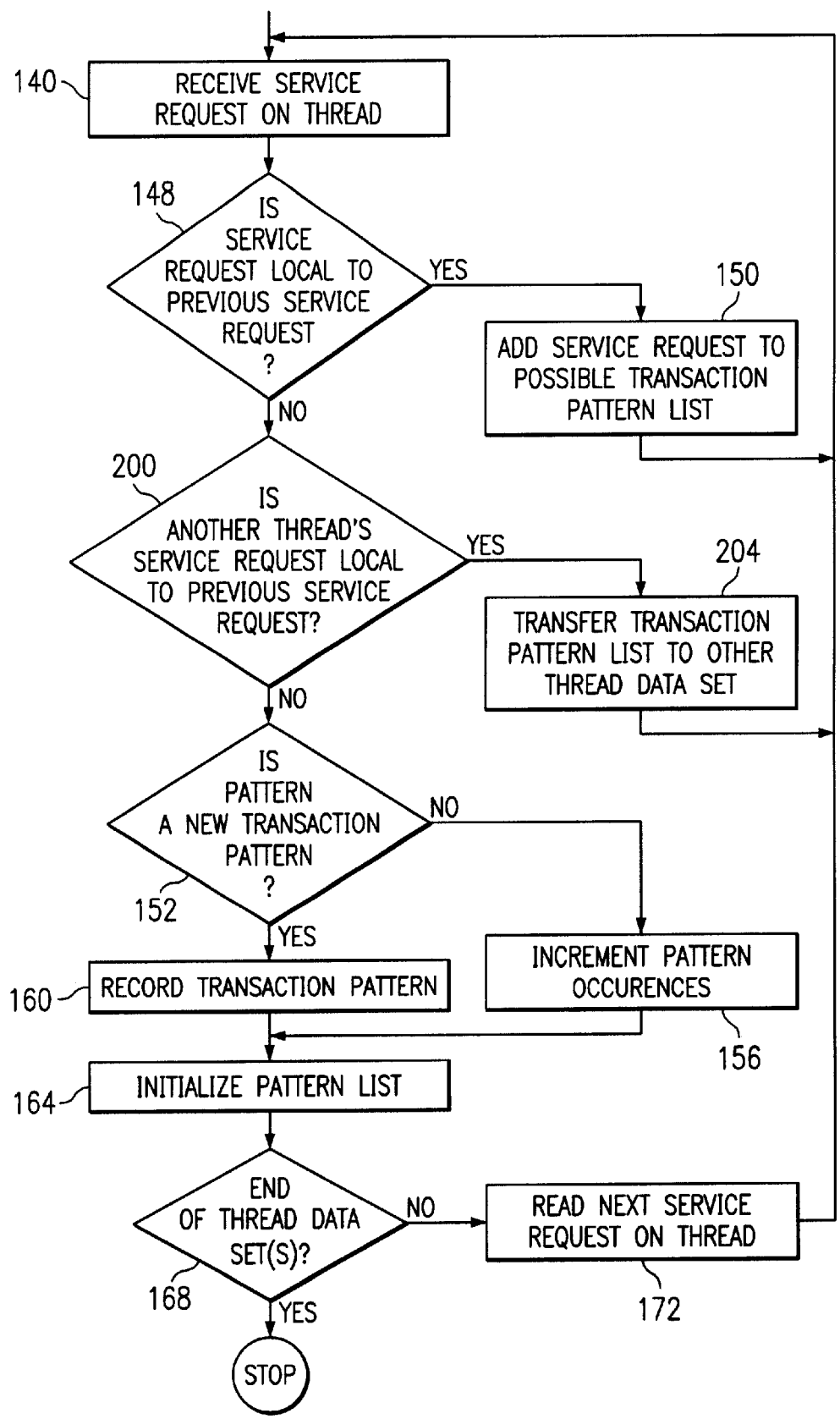
FIGS. 9A–B depict a second embodiment of a method according to the present invention for determining response time.

Referring to FIG. 9A, the second embodiment of the present invention is depicted. FIG. 9A replaces FIG. 6C and otherwise has the same steps as the first embodiment in FIGS. 6A and B. FIG. 6C is substantially identical to FIG. 9A except for decision box 200 and command box 204. As noted above, the second embodiment, unlike the first embodiment, is applicable to applications and/or transactions that have more than one thread for a transaction.

There are generally three situations where an application or transaction has more than one thread per transaction. In one situation, a specific thread will perform only one service request type. After the service request type is performed, the application or transaction utilizes other threads. In another case, the application or transaction is performed on a number of user threads in sequence. For example, a number of service requests are performed on one user thread and a number of later service requests are performed on another user thread. In this manner, the application or transaction can move back and forth among user threads. In the last case, two or more client computers use a shared thread to perform service requests.

To address the use of more than one thread for a transaction, decision box 200, in response to a negative response to decision box 148, determines if the service request sequence that immediately precedes in time the subject service request is local to a service request in other thread data sets.

Figure 10:
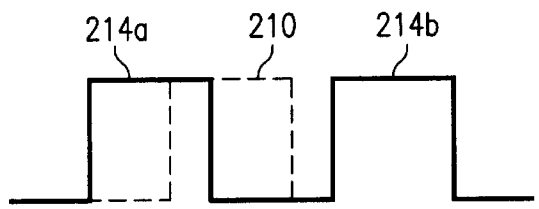
FIGS. 10–11 depict the interactions of service request in the pattern finding and matching steps.
Figure 11:
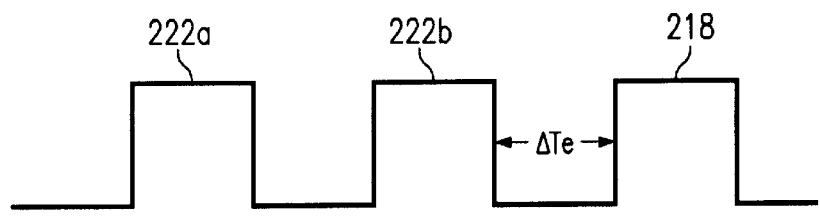

Referring to FIGS. 7 and 10–11, the three possible results in decision box 200 of comparing the service requests in different thread data sets are illustrated. In FIG. 7, a service request 156d in one thread data set is local to the immediately preceding service request sequence (e.g., service requests 156a–c) in another thread data set because a time interval ΔTc between the service request 156c and a service request 156d in the service request sequence is no more than the selected time interval. In FIG. 10, a service request 210 in one thread data set is not local to the service request sequence (e.g., service requests 214a–b) in another thread data set because the service request overlaps the service request sequence. In other words, the service request is not local to the service request sequence if the service request was initiated or incomplete before the completion or initiation, respectively, of a service request in the service request sequence. For a discrete service request or service request sequence to be copied to another thread data set, it is thus critical that the service request or service request sequence does not overlap a portion of the service request sequence on the other thread data set (e.g., service requests 214a–b). In FIG. 11, a service request 218 in one thread data set is not local to. the service request sequence (e.g., service requests 222a–b) in another thread data set because the time intervals ΔTe between the service request 218 and the service requests 222b in the service request sequence are greater than the selected time interval.

A service request or service request sequence can be transferred to one or more thread data sets in series or parallel. For example, the service request or service request sequence in one thread data set can be sequentially transferred to a second thread data set and to a third thread data set (e.g., series) or to two or more other thread data sets at substantially the same time (e.g., parallel).

If the service request sequence is local to a service request in another thread, the service request sequence in command box 204 is transferred to the possible transaction pattern list in the other thread data set. After completing command box 204, the monitoring computer returns to command box 140.

If the service request sequence is not local to a service request in another thread, the monitoring computer continues to decision box 152.

The Transaction Pattern Matching Steps

In the transaction pattern matching steps, the communications data set is compared against the pattern characterization data set from the transaction pattern finding steps to determine whether at least a portion of the plurality of service packets are part of one or more transactions. The start and stop times of the service requests corresponding to the service packets can then be used to provide a response time for the transaction and/or application.

Referring to FIG. 6D, to initiate the transaction pattern matching steps, a service request file is opened in command box 250 to receive service requests read from the communications data set.

In command box 254, a service request is read from the communications data set and dispatched in command box 258 to the appropriate thread to form a thread data set in the service record file with one thread data set existing for each thread.

In decision box 256, the monitoring computer determines if the last service request in the communications data set has been read. If so, the monitoring computer proceeds to command box 262. If not, the monitoring computer returns to command box 254. In this manner, all service requests in the communications data set are sorted by thread data set before the steps of FIG. 6E.

Referring to FIG. 6E, the service request sequences in each thread data set, which are ordered based on start and stop times, are compared against the pattern characterization data set to determine whether at least a portion of the service request sequences are part of a possible transaction pattern.

In decision box 266, the matching process is initiated by comparing a subject service request in a thread data set against the initial service request in the various transaction patterns obtained from all of the thread data sets in the pattern characterization data set. If the service request does not match any of the initial service requests in the transaction patterns obtained for all of the threads, the monitoring computer receives another service request in command box 262 and the decision box 266 is repeated. If the service request matches an initial service request, another service request from the thread data set is received in command box 270.

In decision box 274, the monitoring computer determines whether the service request received in command box 270 is local to the initial service request identified in decision box 266. If not, the monitoring computer returns to command box 262 and repeats the steps described above with another service request. If so, the monitoring computer in decision box 278 determines based on the transaction pattern in the pattern characterization data set if the service request read in command box 270 is the final service request in the transaction pattern.

To determine if the service request is the final service request in a probable transaction, the monitoring computer relies upon the sequence of service requests in the transaction patterns in the thread data set. If the service request is not the final service request in the probable transaction, the monitoring computer returns to command box 270. If the service request is the final service request, the monitoring computer records in command box 282 the start and stop time for the probable transaction pattern and proceeds to decision box 286.

In decision box 282, if it is determined that if all of the service requests in the thread data sets have been characterized into service request sequences, the program is terminated. Otherwise, the computer returns to command box 262. Preferably, the preceding steps are performed in parallel for all of the thread data sets.

The preceding steps yield a pattern analysis data set containing the various service request sequences that together comprise the various transactions, the response times for each transaction, and the location of the recording device. The pattern analysis data set can include additional information, such as user identification and thread identification.

Figure 9B:
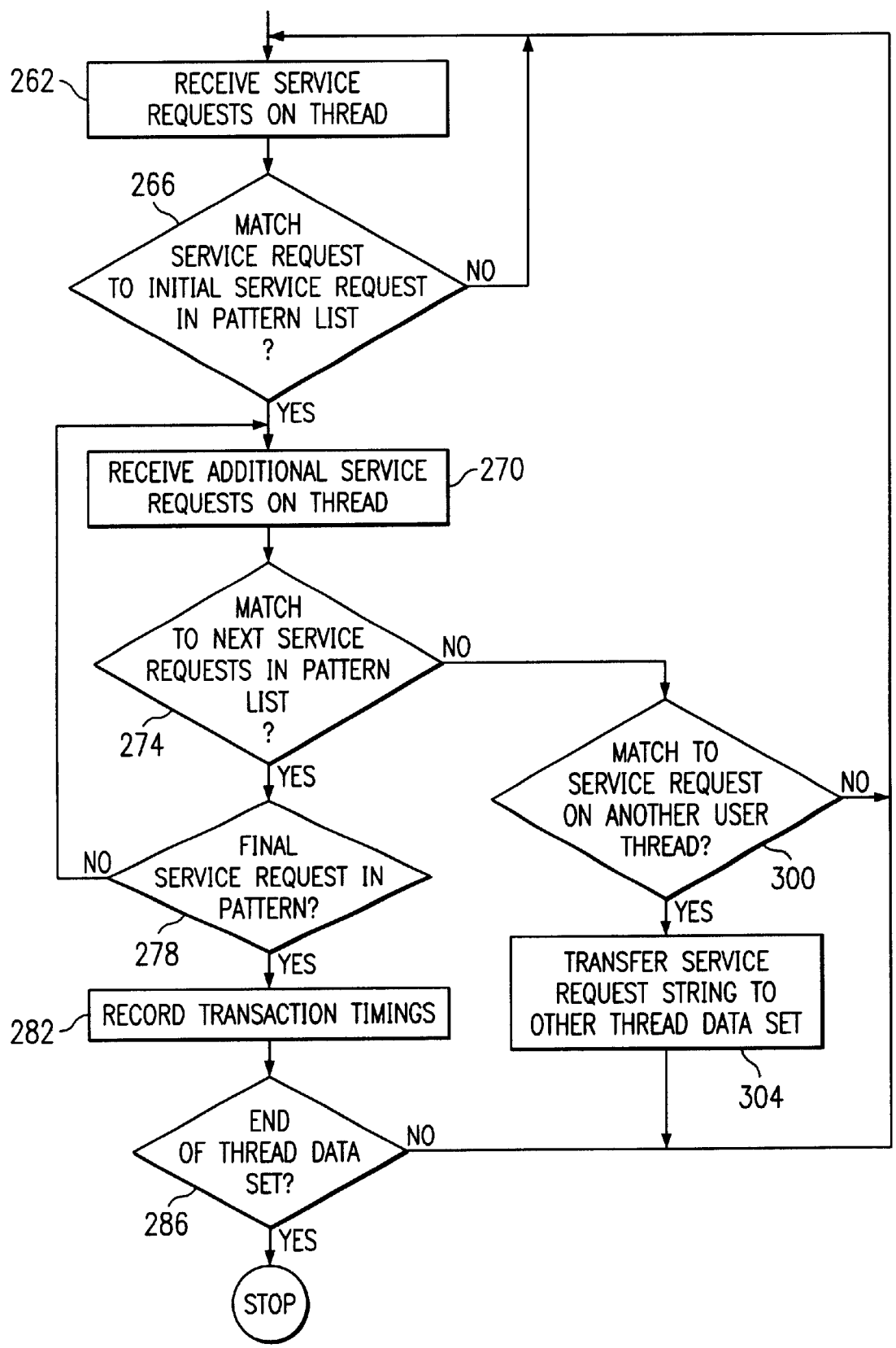

Referring to FIG. 9B, the second embodiment of the present invention is depicted. FIG. 9B replaces FIG. 6E and otherwise has the same steps as the first embodiment in FIG. 6D. FIG. 9B is substantially identical to FIG. 6E except for decision box 300 and command box 304. To address the use of more than one thread for a transaction, decision box 300, in response to a negative response to decision box 274, determines if the service request sequence is local to a service request in another thread data set. If the service request sequence is local to a service request in one or more other thread data set(s), the service request sequence in command box 304 is transferred to the other thread data set(s). After completing command box 304, the monitoring computer returns to command box 262. If the service request sequence is not local to a service request in another thread data set, the monitoring computer continues to decision box 278.

Figure 12:
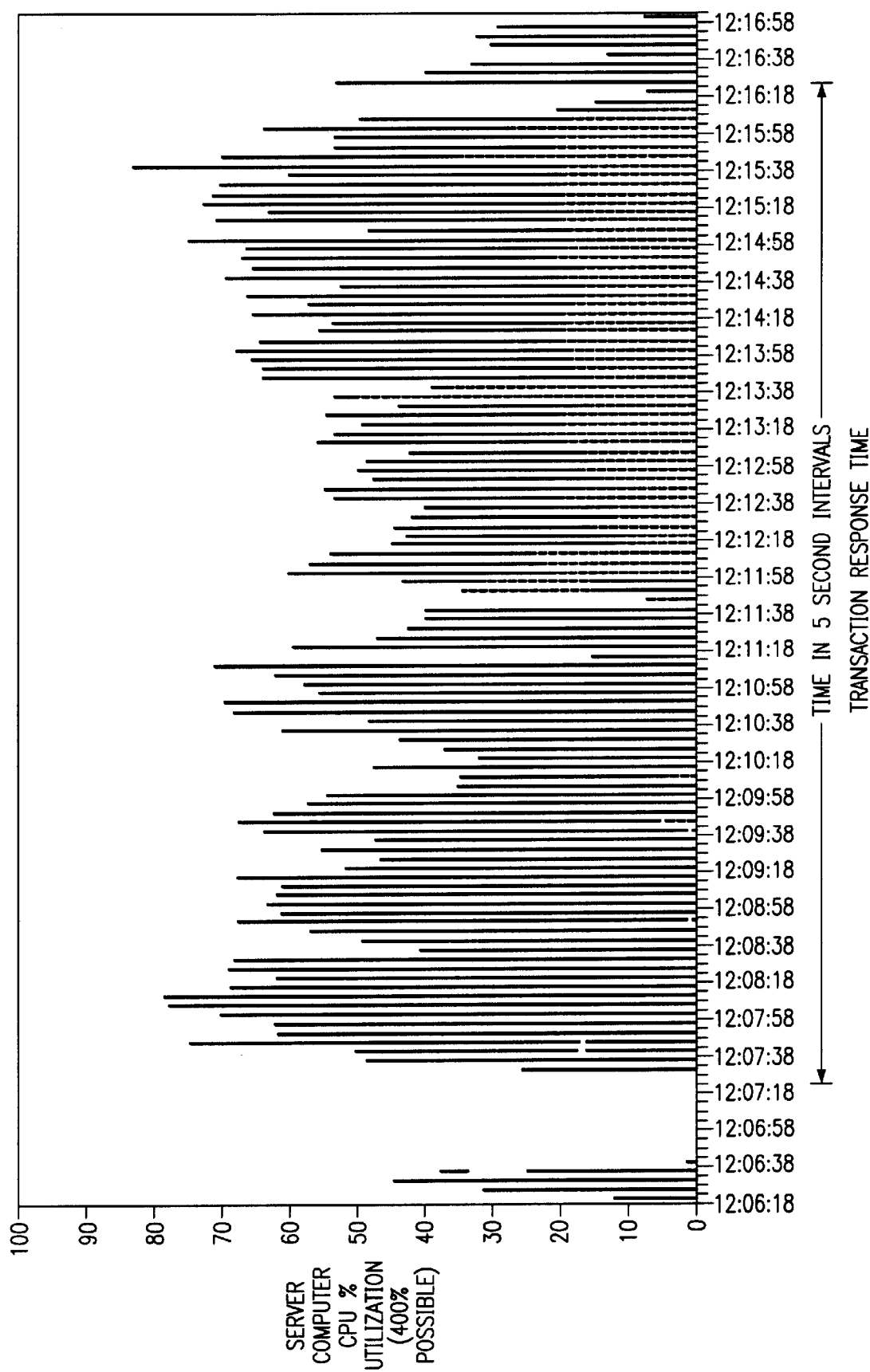
FIG. 12 is a graphical presentation of CPU utilization versus response time for a transaction.

After completion of the preceding steps of the first or second embodiments, the information in the pattern analysis data set can be used to generate performance statistics and transaction counts. For example, the resulting transaction response data can be aggregated into a fixed time interval, such as five minutes, and response time statistics, such as maximum, mean, standard deviation, and 70th, 80th and 90th percentiles, calculated by transaction type. The discrete transaction response time information can be used to analyze response times by service request breakdown within the transaction or by user class and other variants. An example of an analysis report for a transaction is shown in FIG. 12. The data can also be used to determine transaction counts performed over a discrete time period.

The pattern characterization data set can include transaction patterns determined by a process other than the transaction pattern finding steps. By way of example, a test can be performed for the transactions of interest to identify the service request sequences generated during the transactions. This method may be incomplete in some cases because a transaction can generate a mulitplicity of service request sequences based on the particular responses selected by the user.

The transaction pattern finding and matching steps can be modified to discard incomplete service request sequences. Such service request sequences are typically the result of initiating the selected time period for recording of service packets after a transaction has already started or ending the selected time period before a transaction has ended. To eliminate incomplete service request sequences, any service request sequence in a thread data set that is not separated from a preceding or succeeding service request by a time interval that is more than the selected time interval is discarded. This modification assumes, of course, that any service requests separated by a time interval that is more than the selected time interval are not part of the same service request sequence.

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the appended claims.

What is claimed is:

1. A method for analyzing a plurality of data packets communicated between a first computational component and at least one second computational component, comprising:

generating a communications data set including information relating to the plurality of data packets;

sorting the plurality of data packets based on at least one of source and destination to form a plurality of communications data subsets containing data packets indexed by the at least one of source and destination; and analyzing the data packets in each of the plurality of communications data subsets based at least partially on a timing of at least some of the data packets.

2. The method as claimed in claim 1, wherein the communications data set includes information relating to a timing in communicating a collection of data packets from the plurality of data packets and wherein the analyzing step comprises:

determining a pattern for grouping at least some of said plurality of data packets, wherein said grouping corresponds to an occurrence of said pattern, and wherein said pattern is dependent on an ordering of data packets of said plurality of data packets; and comparing said communications data set with said pattern for determining whether at least some of the collection of data packets correspond to an occurrence of said pattern.

3. The method as claimed in claim 2, wherein said generating step comprises:

detecting with a detecting device said data packets communicated along a communications line extending between the first and second computational components;

determining, for each of said data packets, a corresponding received time when the data packet is detected; and recording an identity of each of said data packets and said corresponding received time.

4. The method as claimed in claim 3, further comprising:

adding to said corresponding received time for a data packet, a transit time corresponding substantially to the time required by a data packet to travel from said detecting device to said first computational component.

5. The method as claimed in claim 2, wherein each of a majority of said data packets has at least one of a corresponding node address and a corresponding port number and said communications data set includes for each of said data packets, a corresponding received time when the data packet is detected on said communication line, and said generating step comprises:

reading with a detecting device each of said data packets from said communications line;

filtering said data packets, read by said detecting device, based on at least one of node address and port number to form a selected set of data packets; and recording for each data packet in said selected set of data packets, said corresponding received time.

6. The method as claimed in claim 2, wherein said data packets correspond to a plurality of threads with each thread corresponding to thread identification information and said comparing step comprises:

sorting said data packets in said communications data set into a plurality of thread data sets wherein the data packets in each thread data set have the same thread identification information.

7. The method as claimed in claim 2, wherein said data packets include service request packets and service results packets, each said service request packet corresponds to a service request from the first computational component, and said comparing step comprises:

identifying said service request packets in said data packets using contents of said data packets.

8. The method as claimed in claim 2, wherein said data packets of said collection includes service request packets and corresponding service results packets with each of the service request packets and corresponding service results packets corresponding to a service request and said comparing step comprises:

identifying said service request packets in said collection using contents of said data packets in said collection;

correlating, each service results packet of said collection of service results packets, with a corresponding one of said service request packets; and determining a corresponding start and a corresponding stop time for each of the corresponding service requests, the corresponding start time being related to a corresponding service request packet and the corresponding stop time related to a corresponding service results packet.

9. The method as claimed in claim 8, further comprising:

computing a response time for said grouping using at least some of said start times and said stop times.

10. The method as claimed in claim 8, wherein the determining step comprises:

comparing a time interval between the stop of a first data packet of said plurality of data packets and the start of a second data packet of said plurality of data packets with a predetermined value for said time interval to identify a sequence of data packets corresponding to an occurrence of the grouping.

11. The method as claimed in claim 2, wherein at least some of said data packets in said collection are service request packets for requesting service from the first computational component, and, said comparing step comprises:

first matching a first service request packet in said collection with a representation of a service request packet in a pattern characterization data set;

second matching a second service request packet in said collection with another representation of a service request packet in said pattern characterization data set wherein a time interval between said first and second service request packets is no more than a predetermined value.

12. The method as claimed in claim 2, wherein said data packets of said collection correspond to a plurality of service requests from the first computational component to the second computational component, said service requests correspond to a plurality of thread data sets, and said comparing step comprises:

first matching a first service request corresponding to a first thread with a representation of a service request packet in a pattern characterization data set; and second matching a second service request corresponding to a second thread with another representation of a service request in said pattern characterization data set, wherein a time interval between said first and second service requests is no more than a predetermined value.

13. The method as claimed in claim 2, wherein said collection is substantially identical to said plurality of data packets.

14. The method as claimed in claim 2, wherein said collection includes said grouping of data packets.

15. The method as claimed in claim 2, wherein said grouping and said collection have substantially different data packets of said plurality of data packets.

16. An apparatus for analyzing a plurality of data packets communicated between a first computational component and at least one second computational component, comprising:

means for generating a communications data set including information relating to the plurality of data packets;

means for sorting the plurality of data packets based on at least one of source and destination to form a plurality of communications data subsets containing data packets indexed by the at least one of source and destination; and means for analyzing the data packets in each of the plurality of communications data subsets based at least partially on a timing of at least some of the data packets.

17. The apparatus as claimed in claim 16, wherein the communications data set includes information relating to a timing in communicating a collection of data packets from the plurality of data packets and wherein the means for analyzing further includes:

means for determining a pattern for grouping at least some of said plurality of data packets, wherein said grouping corresponds to an occurrence of said pattern, wherein said pattern is dependent on an ordering of data packets of said plurality of data packets, and wherein the means for determining is in communication with the means for generating;

means for comparing said communications data set with said pattern for determining whether at least some of the collection of data packets correspond to an occurrence of said pattern, wherein the means for comparing is in communication with the means for determining.

18. The apparatus as claimed in claim 17, wherein said comparing means comprises means for contrasting said plurality of data packets and the order in which said data packets are received by said generating means against a pattern characterization data set.

19. The apparatus as claimed in claim 16, wherein said generating means includes a detecting means for detecting said data packets, said detecting means located on at least a portion of a communications line between said first and second computational components.

20. A method for identifying a pattern of communication data packets from a plurality of data packets communicated between a first computational component and at least a second computational component, comprising:

generating a communications data set comprising (i) information relating to a plurality of data packets and (ii) a timing for each data packet;

sorting the information based on at least one of source and destination to form a plurality of communications data subsets containing data packets indexed by the at least one of source and destination; and analyzing the timing of a first data packet and the timing of a second data packet to identify an ordering of said data packets.

21. The method as claimed in claim 20, wherein, in the analyzing step, a time interval between the timing of the first and second data packets is compared with a predetermined value for said time interval.

22. The method as claimed in claim 21, wherein a portion of said data packets correspond to a thread and at least two data packets correspond to different threads and said data packets comprise: (a) a plurality of service request packets, and (b) a plurality of service result packets, wherein each said service request packet corresponds to at least one of the service result packets and said sorting step comprises:

identifying each of said service request packets in said plurality of data packets;

correlating each of said service result packets with the corresponding service request packet for forming a service data subset, wherein said service data subset includes the correlated service request packets and the service result packets; and sorting said service data subsets by thread to form a plurality of thread data sets with the data packets in said thread data set having the same thread addresses.

23. The method as claimed in claim 20, wherein a plurality of sequences of the data packets correspond to a plurality of transactions and said analyzing step comprises:

recording each of said sequences of data packets and the number of occurrences of each sequence in a pattern characterization data set.

24. The method as claimed in claim 21, further comprising:

recording each occurrence of said ordering of data packets and the total number of occurrences thereof in a first communications data set;

selecting a second predetermined value;

comparing said time interval against said second predetermined value to identify a second ordering of said data packets; and recording each occurrence of said second ordering of data packets and the total number of occurrences thereof in a second communications data set.

25. The method as claimed in claim 24, further comprising:

selecting a third predetermined value based on a relationship between (i) the number of occurrences of said ordering of data packets and said predetermined value and (ii) the number of occurrences of said second ordering of data packets and said second predetermined value.

26. The method as claimed in claim 25, further comprising:

comparing said time interval against said third predetermined value for said time interval to identify a third ordering of said data packets.

27. The method as claimed in claim 26, further comprising:

comparing said third ordering against said communications data set to determine whether at least a portion of said plurality of data packets correspond to said third ordering.

28. The method as claimed in claim 20, further comprising:

computing a response time for said ordering.

29. The method as claimed in claim 20, wherein said analyzing step produces a pattern characterization data set having a representation of a plurality of orderings of data packets and further comprising:

comparing said data packets from said analyzing step with said pattern characterization data set to determine if said data packets are contained in said pattern characterization data set.

30. The method as claimed in claim 20, wherein the first data packet corresponds to a first thread and the second data packet corresponds to a second thread.

31. An apparatus for identifying a pattern of communication data packets from a plurality of data packets communicated between a first computational component and at least a second computational component, comprising:

means for generating a communications data set comprising (i) information relating to a plurality of data packets and (ii) a timing for each data packet;

means for sorting the information based on at least one of source and destination to form a plurality of communications data subsets containing data packets indexed by the at least one of source and destination; and means for analyzing a timing of a first data packet and a timing of a second data packet to identify an ordering of said data packets, wherein the means for generating is in communication with the means for sorting and the means for comparing.

32. The apparatus as claimed in claim 31, wherein said means for analyzing compares a time interval between the timing of the first data packet and the timing of the second data packet with a predetermined value for said time interval and wherein said comparing means comprises means for contrasting said plurality of data packets and the ordering thereof against a predetermined ordering of data packets.

33. The apparatus as claimed in claim 31, wherein at least a portion of said plurality of data packets relates to different service request packets, each service request packet corresponding to a service request, said generating means provides a first data set including (i) said plurality of data packets and (ii) a start time and a stop time for each service request corresponding to at least some of said plurality of data packets, and said analyzing means comprises means for contrasting a time interval between the stop time of a first service request and the start time of a second service request against a predetermined value for said time interval to identify a sequence of said service requests corresponding to a transaction.

34. A system for analyzing a plurality of data packets communicated between a first component and a second component, comprising:

a recorder operable to detect the plurality of data packets communicated between the first and second components; and a monitor coupled to the recorder and operable to:

sort the plurality of data packets based on at least one of a source and a destination to form a plurality of communications data subsets containing data packets indexed by the at least one of the source and the destination; and analyze the data packets in each of the plurality of communications data subsets based at least partially on a timing of at least some of the data packets.

35. The system of claim 34, wherein the monitor is operable to analyze the data packets by:

determining a pattern for grouping at least some of the plurality of data packets, the pattern dependent on an ordering of at least some of the data packets; and comparing the plurality of data packets with the pattern to determine whether at least some of the data packets correspond to an occurrence of the pattern.

36. The system of claim 35, wherein the monitor is operable to compare the plurality of data packets with the pattern by comparing the plurality of data packets and an order in which the data packets are received against a pattern characterization data set.

37. The system of claim 34, wherein the recorder comprises a probe.

38. A system for identifying a pattern of data packets in a plurality of data packets communicated between a first component and at least one second component, comprising:
 a recorder operable to detect the plurality of data packets communicated between the first and second components; and
 a monitor coupled to the recorder and operable to:
  sort the plurality of data packets based on at least one of a source and a destination to form a plurality of communications data subsets containing data packets indexed by the at least one of the source and the destination; and
  analyze a timing of a first data packet and a timing of a second data packet to identify an ordering of the first and second data packets.

39. The system of claim 38, wherein the monitor is operable to analyze the first and second data packets by:
 comparing a time interval between the timing of the first and second data packets with a predetermined value; and
 comparing the ordering of the data packets with a predetermined order.

40. The system of claim 38, wherein:
 the first and second data packets relate to different service request packets, each service request packet corresponding to a service request; and
 the monitor compares a time interval between the stop time of a first service request and the start time of a second service request against a predetermined value to identify a sequence of service requests corresponding to a transaction.

41. A method for analyzing communication between a first component and at least one second component, comprising:
 receiving a plurality of data packets communicated over a plurality of threads between the first component and at least one second component, the data packets associated with a plurality of service requests;
 determining a start time and a stop time for at least some of the service requests associated with at least some of the data packets;
 sorting the service requests into a plurality of thread data subsets based on the thread over which the data packets associated with the service requests were communicated; and
 analyzing the service requests in each of the thread data subsets.

42. The method of claim 41, wherein the data packets comprise service request packets and service completion packets, each service request associated with at least one service request packet and at least one service completion packet.

43. The method of claim 42, further comprising generating a communications data set by:
 receiving a first of the data packets;
 determining that the first data packet comprises a service request packet;
 examining at least one second data packet to identify a service completion packet; and
 recording a receive time of the first data packet and a receive time of the second data packet, the receive time of the first data packet comprising the start time of the service request associated with the first data packet, the receive time of the second data packet comprising the stop time of the service request associated with the first data packet.

44. The method of claim 41, further comprising sorting the service requests in each thread data subset by at least one of the start time and the stop time.

45. The method of claim 41, wherein analyzing the service requests comprises:
 determining a time interval between the stop time of a first service request and the start time of a second service request, the first and second service requests associated with a common thread data subset;
 comparing the time interval to a predetermined value; and
 adding at least one of the first and second service requests to a pattern list when the time interval is less than the predetermined value, the pattern list identifying at least a portion of a service request sequence associated with a transaction.

46. The method of claim 45, wherein:
 the time interval comprises a first time interval; and
 analyzing the service requests further comprises:
  determining a second time interval between the stop time of the first service request and the start time of a third service request, the first and third service requests associated with different thread data subsets;
  comparing the second time interval to the predetermined value; and
  transferring the pattern list to the thread data subset of the third service request when the second time interval is less than the predetermined value.

47. The method of claim 46, wherein analyzing the service requests further comprises:
 comparing the pattern list to one or more identified patterns in a pattern characterization data set when the first and second time intervals exceed the predetermined value;
 updating a number of occurrences of one of the identified patterns when the pattern list matches that identified pattern; and
 recording the pattern list as a new pattern in the pattern characterization data set when the pattern list does not match the identified patterns in the pattern characterization data.

48. The method of claim 47, wherein analyzing the service requests in each of the thread data subsets comprises analyzing the service requests in each of the thread data subsets in parallel.

49. The method of claim 47, wherein analyzing the service requests further comprises:
 repeating processing of the service requests using a plurality of additional predetermined values;
 using a total number of patterns identified for each of the predetermined values to select an optimal predetermined value; and
 repeating processing of the service requests using the optimal predetermined value to generate a second pattern characterization data set comprising an optimal listing of patterns.

50. A system for analyzing communication between a first component and at least one second component, comprising:
 at least one recorder operable to detect a plurality of data packets communicated between the first and second components over a plurality of threads; and
 a monitor coupled to the at least one recorder and operable to:
  receive the plurality of data packets, the data packets associated with a plurality of service requests;

determine a start time and a stop time for at least some of the service requests associated with at least some of the data packets;

sort the service requests into a plurality of thread data subsets based on the thread over which the data packets associated with the service requests were communicated; and analyze the service requests in each of the thread data subsets.

51. The system of claim 50, wherein the data packets comprise service request packets and service completion packets, each service request associated with at least one service request packet and at least one service completion packet.

52. The system of claim 51, wherein the monitor is operable to determine the start time and the stop time for at least some of the service requests by:

receiving a first of the data packets;

determining that the first data packet comprises a service request packet;

examining at least one second data packet to identify a service completion packet; and recording a receive time of the first data packet and a receive time of the second data packet, the receive time of the first data packet comprising the start time of the service request associated with the first data packet, the receive time of the second data packet comprising the stop time of the service request associated with the first data packet.

53. The system of claim 50, wherein the monitor is further operable to sort the service requests in each thread data subset by at least one of the start time and the stop time.

54. The system of claim 50, wherein the monitor is operable to analyze the service requests by:

determining a time interval between the stop time of a first service request and the start time of a second service request, the first and second service requests associated with a common thread data subset;

comparing the time interval to a predetermined value; and adding at least one of the first and second service requests to a pattern list when the time interval is less than the predetermined value, the pattern list identifying at least a portion of a service request sequence associated with a transaction.

55. The system of claim 54, wherein:

the time interval comprises a first time interval; and the monitor is further operable to analyze the service requests by:

determining a second time interval between the stop time of the first service request and the start time of a third service request, the first and third service requests associated with different thread data subsets;

comparing the second time interval to the predetermined value; and transferring the pattern list to the thread data subset of the third service request when the second time interval is less than the predetermined value.

56. The system of claim 55, the monitor is further operable to analyze the service requests by:

comparing the pattern list to one or more identified patterns in a pattern characterization data set when the first and second time intervals exceed the predetermined value;

updating a number of occurrences of one of the identified patterns when the pattern list matches that identified pattern; and recording the pattern list as a new pattern in the pattern characterization data set when the pattern list does not match the identified patterns in the pattern characterization data.

57. The system of claim 56, wherein the monitor is operable to analyze the service requests in each of the thread data subsets in parallel.

58. The system of claim 56, wherein the monitor is further operable to analyze the service requests by:

repeating processing of the service requests using a plurality of additional predetermined values;

using a total number of patterns identified for each of the predetermined values to select an optimal predetermined value; and repeating processing of the service requests using the optimal predetermined value to generate a second pattern characterization data set comprising an optimal listing of patterns.

59. A method for identifying a pattern in communication between a first component and at least one second component, comprising:

receiving a plurality of data packets communicated over a plurality of threads between the first component and at least one second component, the data packets associated with a plurality of service requests;

determining a start time and a stop time for at least some of the service requests associated with at least some of the data packets;

sorting the service requests into a plurality of thread data subsets based on the thread over which the data packets associated with the service requests were communicated; and analyzing the service requests in each of the thread data subsets to identify one or more transactions involving at least at portion of the service requests.

60. The method of claim 59, further comprising sorting the service requests in each thread data subset by at least one of a start time and a stop time associated with each service request.

61. The method of claim 59, wherein analyzing the service requests comprises comparing the service requests in the thread data subsets against a plurality of transaction patterns in a pattern characterization data set.

62. The method of claim 61, wherein comparing the service requests in the thread data subsets against the transaction patterns comprises:

selecting a first service request in a first thread data subset;

comparing the first service request to an initial service request in each of the transaction patterns;

adding the first service request to a transaction list when the first service request matches the initial service request in at least one transaction pattern; and discarding the first service request and selecting at least one additional service request in the first thread data subset when the first service request does not match the initial service request in any of the transaction patterns.

63. The method of claim 62, wherein comparing the service requests in the thread data subsets against the transaction patterns further comprises:

selecting a second service request in the first thread data subset when the first service request matches at least one initial service request in at least one transaction pattern;

comparing the second service request to a secondary service request in the at least one transaction pattern; and adding the second service request to the transaction list when the second service request matches the secondary service request in at least one transaction pattern.

64. The method of claim 63, wherein comparing the service requests in the thread data subsets against the transaction patterns further comprises:

comparing a third service request in a second thread data subset to the secondary service request in the at least one transaction pattern when the second service request does not match the secondary service request in any of the at least one transaction pattern; and transferring the transaction list to the second thread data subset when the third service request matches the secondary service request in the at least one transaction pattern.

65. The method of claim 63, wherein comparing the service requests in the thread data subsets against the transaction patterns further comprises:

determining whether the secondary service request in the at least one transaction pattern is a final service request in the at least one transaction pattern when the second service request matches the secondary service request in the at least one transaction pattern; and recording a start time and a stop time associated with the transaction list when the secondary service request in the at least one transaction pattern is the final service request in the at least one transaction pattern.

66. A system for identifying a pattern in communication between a first component and at least one second component, comprising:

at least one recorder operable to detect a plurality of data packets communicated between the first and second components over a plurality of threads; and a monitor coupled to the at least one recorder and operable to:

receive the plurality of data packets, the data packets associated with a plurality of service requests;

determine a start time and a stop time for at least some of the service requests associated with at least some of the data packets;

sort the service requests into a plurality of thread data subsets based on the thread over which the data packets associated with the service requests were communicated; and analyze the service requests in each of the thread data subsets to identify one or more transactions involving at least at portion of the service requests.

67. The system of claim 66, wherein the monitor is further operable to sort the service requests in each thread data subset by at least one of a start time and a stop time associated with each service request.

68. The system of claim 66, wherein the monitor is operable to analyze the service requests by comparing the service requests in the thread data subsets against a plurality of transaction patterns in a pattern characterization data set.

69. The system of claim 68, wherein the monitor is operable to compare the service requests in the thread data subsets against the transaction patterns by:

selecting a first service request in a first thread data subset;

comparing the first service request to an initial service request in each of the transaction patterns;

adding the first service request to a transaction list when the first service request matches the initial service request in at least one transaction pattern; and discarding the first service request and selecting at least one additional service request in the first thread data subset when the first service request does not match the initial service request in any of the transaction patterns.

70. The system of claim 69, wherein the monitor is further operable to compare the service requests in the thread data subsets against the transaction patterns by:

selecting a second service request in the first thread data subset when the first service request matches at least one initial service request in at least one transaction pattern;

comparing the second service request to a secondary service request in the at least one transaction pattern; and adding the second service request to the transaction list when the second service request matches the secondary service request in at least one transaction pattern.

71. The system of claim 70, wherein the monitor is operable to compare the service requests in the thread data subsets against the transaction patterns by:

comparing a third service request in a second thread data subset to the secondary service request in the at least one transaction pattern when the second service request does not match the secondary service request in any of the at least one transaction pattern; and transferring the transaction list to the second thread data subset when the third service request matches the secondary service request in the at least one transaction pattern.

72. The system of claim 70, wherein the monitor is operable to compare the service requests in the thread data subsets against the transaction patterns by:

determining whether the secondary service request in the at least one transaction pattern is a final service request in the at least one transaction pattern when the second service request matches the secondary service request in the at least one transaction pattern; and recording a start time and a stop time associated with the transaction list when the secondary service request in the at least one transaction pattern is the final service request in the at least one transaction pattern.

* * * * *